US008733994B2

(12) United States Patent
Na et al.

(10) Patent No.: US 8,733,994 B2

(45) Date of Patent: May 27, 2014

(54) HEAD LAMP STRUCTURE OF VEHICLE

(75) Inventors: Jin Ho Na, Suwon-si (KR); Jun Mo Ku, Hwaseong-si (KR); Young Ho Son, Gyeongsan-si (KR)

(73) Assignee: Hyundai Motor Company, Seoul (KR)

( * ) Notice: Subject to any disclaimer, the term of this patent is extended or adjusted under 35 U.S.C. 154(b) by 7 days.

(21) Appl. No.: 13/549,084

(22) Filed: Jul. 13, 2012

(65) Prior Publication Data

US 2013/0170243 A1 Jul. 4, 2013

(30) Foreign Application Priority Data

Dec. 28, 2011 (KR) ........................ 10-2011-0144718

(51) Int. Cl.
*B60Q 1/00* (2006.01)

(52) U.S. Cl.
USPC ........................................................ 362/539

(58) Field of Classification Search
USPC ........................................................ 362/539
See application file for complete search history.

(56) References Cited

U.S. PATENT DOCUMENTS

| | | | | |
|---|---|---|---|---|
| 7,575,353 | B2 * | 8/2009 | Oyama | 362/539 |
| 7,736,037 | B2 * | 6/2010 | Losak et al. | 362/539 |
| 8,480,270 | B2 * | 7/2013 | Mochizuki | 362/465 |
| 2009/0154187 | A1 * | 6/2009 | Kim et al. | 362/539 |

FOREIGN PATENT DOCUMENTS

| | | | |
|---|---|---|---|
| JP | 2005-259549 | A | 9/2005 |
| KR | 2000-0039345 | A | 7/2000 |
| KR | 10-0783316 | B1 | 12/2007 |
| KR | 10-0832516 | B1 | 5/2008 |
| KR | 10-2009-0131481 | A | 12/2009 |
| KR | 10-2010-0011694 | A | 2/2010 |
| KR | 10-2010-0079941 | A | 7/2010 |

* cited by examiner

*Primary Examiner* — Evan Dzierzynski

(74) *Attorney, Agent, or Firm* — Morgan, Lewis & Bockius LLP

(57) ABSTRACT

A head lamp structure of the vehicle may include a reflector including a light source, and a shield part rotatably provided at a front of the reflector and including a shield protrusion formed at an outer peripheral surface thereof and having a cutting surface.

6 Claims, 5 Drawing Sheets

(a)

(b)

HEAD LAMP STRUCTURE OF VEHICLE

CROSS-REFERENCE TO RELATED APPLICATION

The present application claims priority to Korean Patent Application No. 10-2011-0144718, filed on Dec. 28, 2011 in the Korean Intellectual Property Office, the entire contents of which is incorporated herein for all purposes by this reference.

BACKGROUND OF THE INVENTION

1. Field of the Invention

The present disclosure relates to a head lamp structure of the vehicle, and more particularly, to a head lamp structure of the vehicle preventing a glaring phenomenon from occurring in a preceding car and an oncoming car even when a driver operates a high beam by changing beam patterns in response to a change in a shield shape.

2. Description of Related Art

Generally, the vehicle includes a lamp device having a lighting function of allowing a driver to see objects better during night driving and a function of informing the vehicle driving state of the vehicle of other vehicles or road users.

A head lamp referred to as a headlight, which is a lighting lamp that shines a light onto a road in front of the vehicle, needs brightness capable of differentiating obstacles on a road 100 m ahead at night.

A standard of the head lamp may be differently set from country to country. In particular, a lighting direction of a head lamp beam is differently set according to a right pass (left driving) or a left pass (right driving).

Meanwhile, when the head lamp of the vehicle in accordance with the related art uses a high beam, the high beam gives a strong glaring light to drivers of vehicles travelling on a two-lane road or a downtown other than an expressway, a road without streetlamps and travelling on the other lane during night driving, such that it is difficult for a driver to secure his/her front line of sight. As a result, a traffic accident may be caused and safety may be degraded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a head lamp structure of the vehicle, and more particularly, to head lamp structure of the vehicle preventing a glaring phenomenon from occurring in a preceding car and an oncoming car even when a driver operates a high beam by changing beam patterns in response to a change in a shield shape.

In an aspect of the present invention, a head lamp structure of a vehicle, may include a reflector including a light source, and a shield part rotatably provided at a front of the reflector and including a shield protrusion formed at an outer peripheral surface thereof and having a cutting surface.

The shield part is disposed between the reflector and the lens.

The shield part is in a semi-circular shape and a portion of the semi-circular shape is cut along a longitudinal direction of the shield part.

A middle end of the shield protrusion is provided with a refracting surface in a spiral shape such that one side end of the shield protrusion is formed to have a semi-circular shape and the other side end thereof is formed to have a fan shape.

The shield part is formed to have cross sections in different shapes according to a rotation angle.

A cross-sectional area of the shield part is changed by the refracting surface at the time of rotating the shield part.

Beam patterns of the left and right of the head lamp are changed according to a rotation angle of the shield part when the shield part is applied to both sides of the head lamp.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
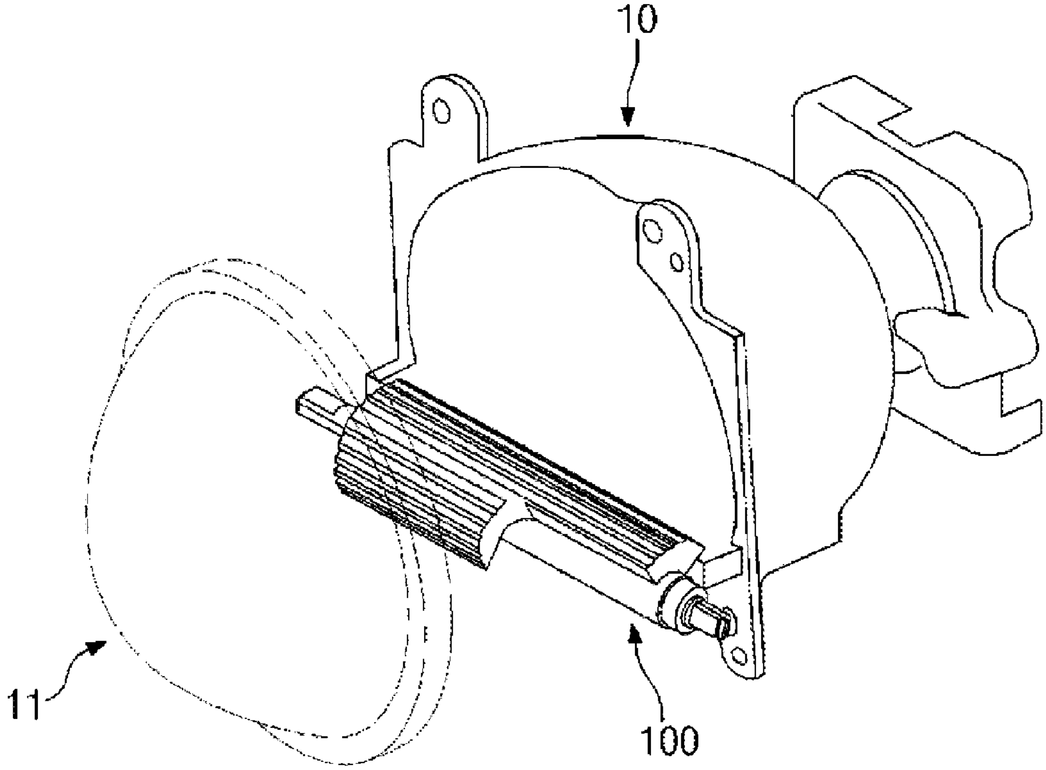
FIG. 1 is a diagram showing a head lamp structure of the vehicle in accordance with an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
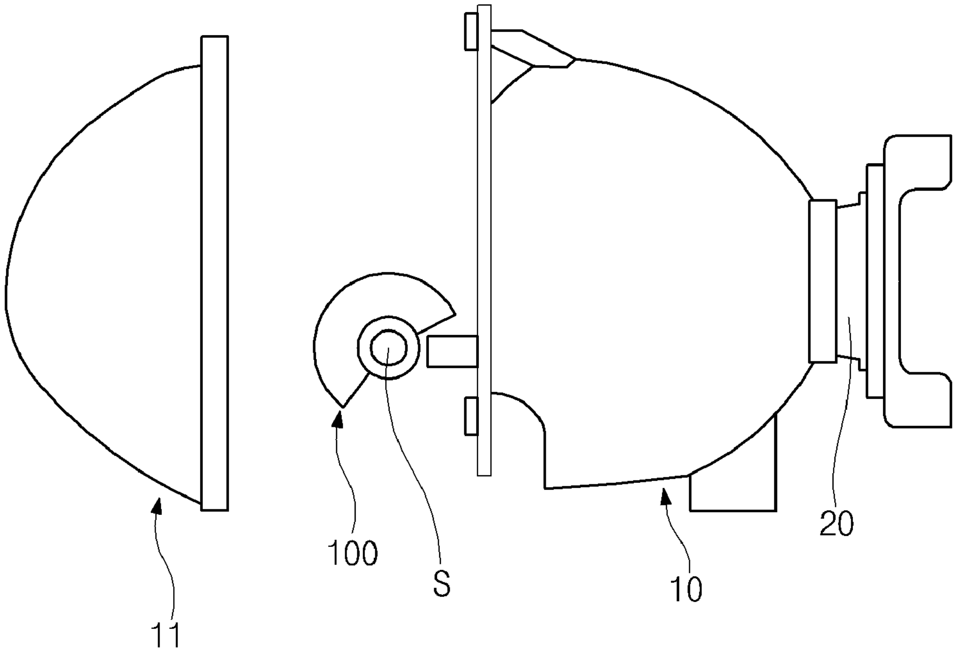
FIG. 2 is a side view showing the head lamp structure of the vehicle in accordance with the exemplary embodiment of the present disclosure.
Figure 3:
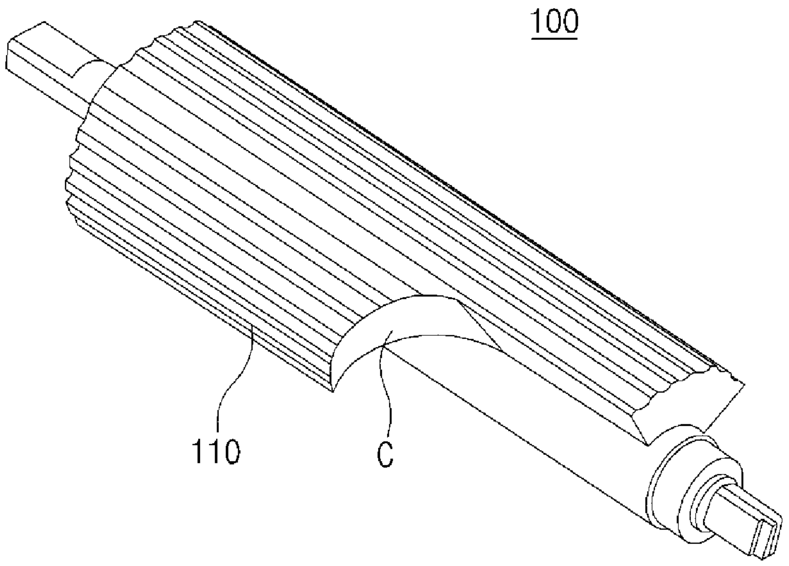
FIG. 3 is a diagram showing a shield part of the head lamp structure of the vehicle in accordance with an exemplary embodiment of the present disclosure.

FIGS. 1 to 5 show a structure of a head lamp of a vehicle in accordance with an exemplary embodiment of the present disclosure. FIG. 1 is a diagram showing a head lamp structure of a vehicle in accordance with an exemplary embodiment of the present disclosure, FIG. 2 is a side view showing the head lamp structure of a vehicle in accordance with the exemplary embodiment of the present disclosure, and FIG. 3 is a diagram showing a shield part of the head lamp structure of a vehicle in accordance with an exemplary embodiment of the present disclosure.

Figure 4:
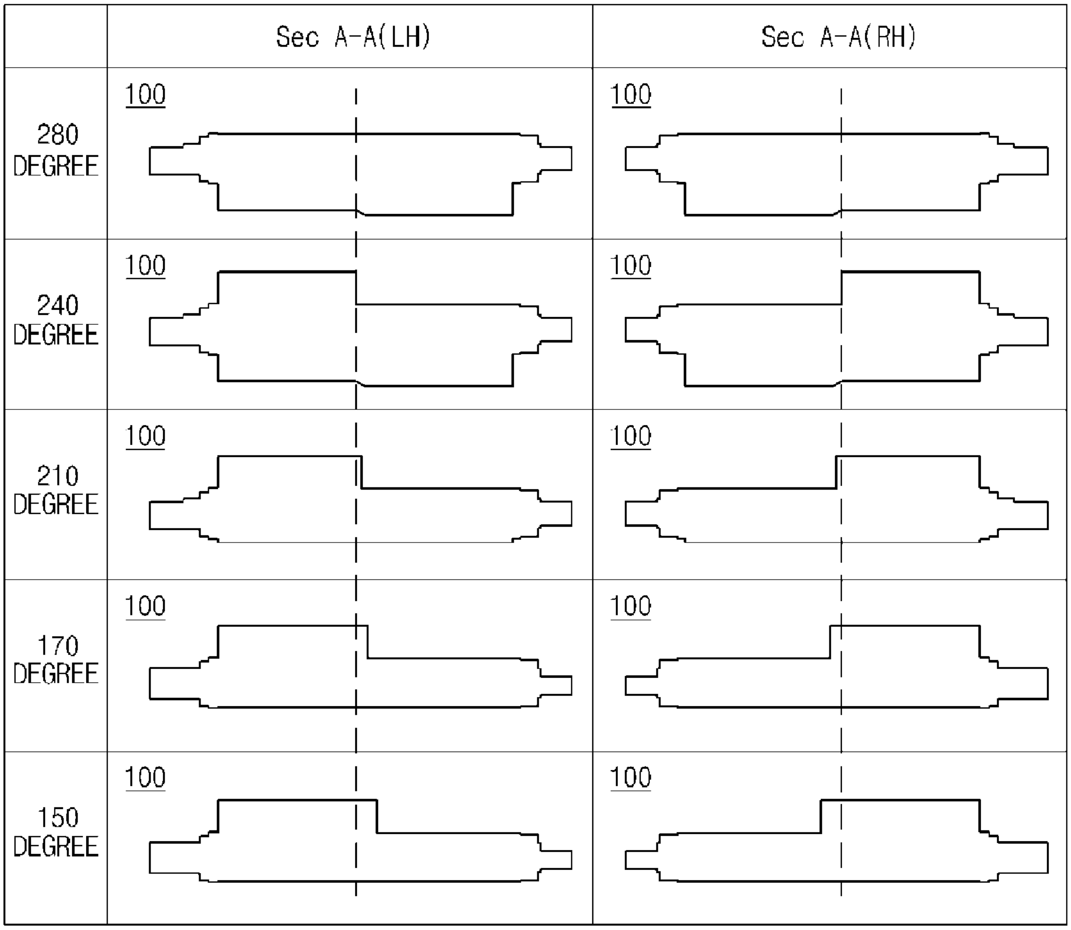
FIG. 4 is a diagram showing a shape according a rotation angle of the shield part of the head lamp structure of the vehicle in accordance with the exemplary embodiment of the present disclosure.
Figure 5:
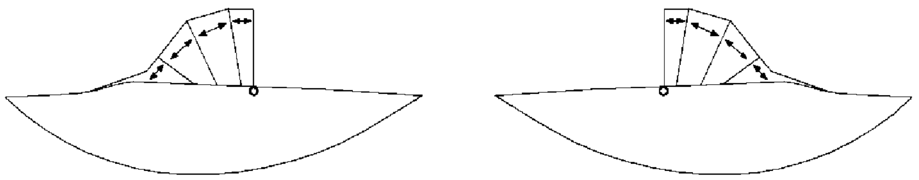
FIG. 5 is a diagram showing beam patterns according to the head lamp structure of the vehicle in accordance with the exemplary embodiment of the present disclosure.
Figure 5:
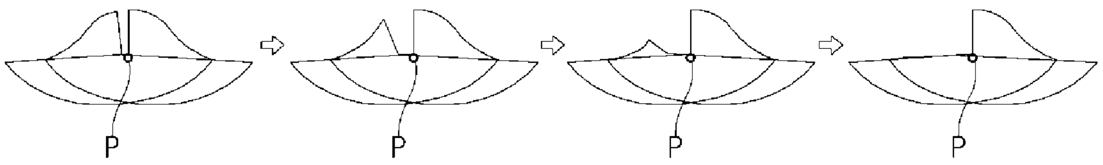

Further, FIG. 4 is a diagram showing a shape according a rotation angle of the shield part of the head lamp structure of a vehicle in accordance with the exemplary embodiment of the present disclosure and FIG. 5 is a diagram showing a beam pattern by the head lamp structure of a vehicle in accordance with the exemplary embodiment of the present disclosure.

Exemplary embodiments of the present disclosure will be described in detail with reference to the accompanying drawings.

As shown in FIGS. 1 to 5, the head lamp structure of a vehicle in accordance with the exemplary embodiment of the present disclosure includes a rotatable shield part 100 between a reflector 10 and a lens 11. Meanwhile, technical characteristics of the head lamp structure of a vehicle are as follows, an outer peripheral surface of the shield part 100 is provided with a shield protrusion 110 having a cutting surface to change a beam pattern of light reflected from the reflector 10 according to a rotation of the shield part 100.

Hereinafter, each component of the head lamp structure of a vehicle will be described with reference to the accompanying drawings.

First, the exemplary embodiment of the present disclosure basically includes a reflector 10 and a shield part 100 provided in the reflector 10.

As shown in FIGS. 1 and 2, the reflector 10 is a semi-spherical shape, wherein an inside of a closed aperture is provided with a light source 20 and an aperture is provided with the shield part 100 to be described below.

In this case, an aperture of the reflector 10 is further provided with the lens 11. In this configuration, light emitted from a light source may be reflected through the reflector 10 and then, may be irradiated to the outside through the lens 11.

The sealed part 100 is formed to have a bar shape and may be rotatably provided at a front surface of the aperture of the reflector 10.

As shown in FIG. 3, an outer peripheral surface of the shield part 100 is provided with the shield protrusion 110 having the cutting surface. In this configuration, when the light emitted from the light source is reflected from the reflector 10 and then, is irradiated to the outside through the lens 11, the beam pattern of the light reflected from the reflector 10 is changed according to the rotation of the shield part 100.

In this case, the cutting surface of the shield protrusion 110 is refracted in a spiral shape, such that one side end of the shield protrusion 110 may be formed to have a semi-circular shape and the other side end thereof may be formed to have a fan shape, based on the cutting surface.

Meanwhile, forming the shield part 100 including the shield protrusion 110 so as to have a section in different shapes according to a rotation angle of the shield part 100 can be implemented by changing a cross-sectional area of the shield part 100 by the refracting surface C formed on the shield protrusion 110 at the time of rotating the shield part 100.

In this configuration, even though changing the cross-sectional area of the shield part 100 is changed due to a covered amount of the spiral refracting surface C, the spiral refracting surface C rotates according to the rotation of the shield part 100 when the shield part 100 rotates based on a central axis S of the shield part 100 shown in FIG. 4.

In an aspect of the present invention, the shield part 100 may be in a semi-circular shape and a portion of the semi-circular shape is cut along a longitudinal direction of the shield part 100.

In this case, a rotation angle of the shield part 100 shown in FIG. 4 is only an example of the present disclosure and therefore, may be differently set according to a vehicle.

As such, when the shield part 100 including the refracting surface C and the shield protrusion 110 is applied to both sides of the head lamp of the vehicle, the cross-sectional area of the shield part 100 is changed according to the rotation of the shield part 100, such that the beam patterns of the left and right of the head lamp may be changed Hereinafter, actions and effects of the exemplary embodiment of the present disclosure will be described below.

As shown in FIGS. 1 to 2, the head lamp structure of a vehicle according to the exemplary embodiment of the present disclosure includes a rotatable shield part 100 between the reflector 10 and the lens 11, wherein the outer peripheral surface of the shield part 100 is provided with the shield protrusion 110 having the cutting surface to change the beam patterns of light reflected from the reflector 10 according to the rotation of the shield part 100.

In this configuration, as shown in FIGS. 3 and 4, changing the beam patterns is due to the change in the beam patterns of light reflected from the reflector 10 since the cross section shape of the shield protrusion 100 is changed according to the rotation of the shield part 100 by forming one end of the shield protrusion 110 formed on the shield part 100 in a semi-circular shape and forming the other end thereof in a fan shape.

As a result, as shown in FIG. 5, when the driver operates the high beam without a movement of a maximum luminous point (P) in the beam patterns irradiated to the outside through a left head lamp and a right head lamp, it is possible to prevent the glaring phenomenon from occurring in the other car.

The head lamp structure of a vehicle in accordance with the exemplary embodiment of the present disclosure configured as described above includes the reflector including the light source and the shield part including the shield protrusion formed at the outer peripheral surface thereof and having the cutting surface to change the beam patterns in response to only the change in the shield shape, to thereby suppress the glaring phenomenon from occurring in the proceeding car or the oncoming car when the driver operates the high beam. As a result, the exemplary embodiment of the present disclosure can improve the value of commodities and the safety.

As set forth above, the exemplary embodiments of the present disclosure can prevent the glaring phenomenon from occurring in the preceding car or the oncoming car even when the head lamp of a vehicle emits the high beam by changing the beam patterns only in response to the change in the shield shape, to thereby improve the value of commodities and the safety.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A head lamp structure of a vehicle comprising:

a reflector including a light source; and a shield part rotatably provided at a front of the reflector and including a shield protrusion formed at an outer peripheral surface thereof and having a cutting surface;

wherein a middle end of the shield protrusion is provided with a refracting surface in a spiral shape such that one side end of the shield protrusion is formed to have a semi-circular shape and the other side end thereof is formed to have a fan shape.

2. The head lamp structure of the vehicle according to claim 1, wherein the shield part is disposed between the reflector and a lens.

3. The head lamp structure of the vehicle according to claim 1, wherein the shield part is in a semi-circular shape and a portion of the semi-circular shape is cut along a longitudinal direction of the shield part.

4. The head lamp structure of the vehicle according to claim 1, wherein the shield part is formed to have cross sections in different shapes according to a rotation angle.

5. The head lamp structure of the vehicle according to claim 4, wherein a cross-sectional area of the shield part is changed by the refracting surface at the time of rotating the shield part.

6. The head lamp structure of the vehicle according to claim 1, wherein beam patterns of the left and right of the head lamp are changed according to a rotation angle of the shield part when the shield part is applied to both sides of the head lamp.

* * * * *